UNITED STATES PATENT OFFICE.

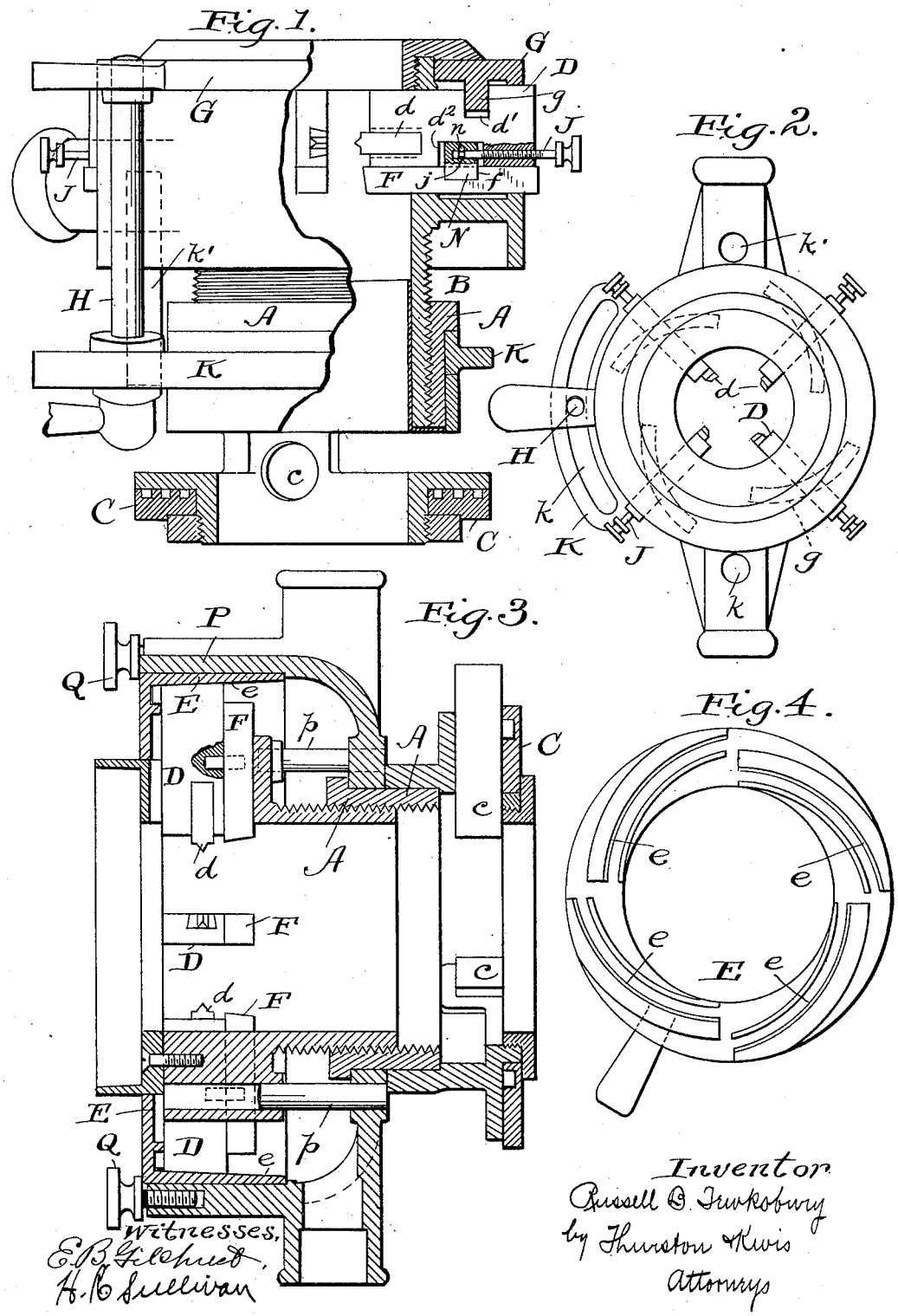

RUSSELL B. TEWKSBURY, OF CLEVELAND, OHIO.

THREAD-CUTTING TOOL.

1,006,511.  Specification of Letters Patent.  Patented Oct. 24, 1911.

Application filed January 27, 1911. Serial No. 604,929.

*To all whom it may concern:*

Be it known that I, RUSSELL B. TEWKSBURY, a citizen of the United States, residing at Cleveland, in the county of Cuyahoga and State of Ohio, have invented a certain new and useful Improvement in Thread-Cutting Tools, of which the following is a full, clear, and exact description.

This invention pertains to tools for cutting tapered threads on cylindrical work, whether solid or tubular. Tools adapted for this purpose, whether portable hand tools commonly known as die stocks, or tools adapted to be power driven, or tools adapted to be used in machines of the lathe type, have heretofore been provided either with thread cutting chasers which gradually recede as they cut the threads on the work, or with thread cutting chasers which do not recede while the work is progressing, but which have their thread cutting ends formed with the required taper. Both forms are open to the same objection, viz., that the thread cutting chasers are required not only to chase the thread, but also to cut away the surplus stock to properly taper the work. The result is that the chasers soon get dull and must be sharpened, or thrown away and others substituted,—the latter being the usual practice.

It is to provide a practical tool which is not open to these objections that this invention is designed.

The invention consists in the employment, in a thread cutting tool, of a cutter or cutters of the sort commonly employed in lathes for turning down work, and chaser blocks carrying replaceable chasers which are located in such position that they will act upon the work and chase the thread after the cutter or cutters have turned the work down to the tapered form, and means for causing the simultaneous gradual recession of the cutters and chaser blocks as the work progresses.

It also includes the provision of means for relatively adjusting the position of the chaser blocks and cutters.

It also consists in certain more specific combinations which are shown in the drawing and hereinafter described,—all of which are definitely pointed out in the claims.

Two embodiments of the invention are shown in the drawing, in which—

Figure 1 is a side view, partly in longitudinal section, of one embodiment of the invention. Fig. 2 is an end view of the tool shown in Fig. 1. Fig. 3 is a side view, partly in longitudinal section, of another embodiment of the invention. Fig. 4 is a detached view of the adjuster which forms a part of the tool shown in Fig. 3.

Referring to the parts by letters, A represents a tubular work holder adapted to embrace and to be fixed to the work which is to be tapered and threaded. Radially movable clamping pins $c$ and a cam plate C for operating them, all carried by the work holder, are shown as the means for so fixing the work holder on the work. This, however, is familiar construction, and requires no further description.

B represents the tubular stock which has a lead screw connection with the work holder. This stock has radial guide-ways; and in them are fitted radially movable cutters F substantially such, as to their cutting ends, as cutters which are used in lathes to turn down rotating work. Associated with each cutter is a chaser block D, which is also slidably fitted in the same guide-way. Each of these chaser blocks carries a removable and replaceable chaser $d$ which may have as many cutting teeth as desired, although it is shown in the drawing as having only one tooth.

In the specific construction shown, which, by the way, is not essential to the invention as broadly claimed, there is a dove-tail groove in one side face of each chaser block D, and in this groove a properly shaped chaser $d$ is nicely fitted. The relative lengths of the chaser and groove are such that when the end of the chaser abuts the end of the groove, the end of the chaser which carries the cutting tooth will project a suitable distance beyond the inner end of the chaser block.

It is essential that in the use of this tool each chaser block and its associated cutter shall be movable in their guide-ways for the purpose of adjusting them to the size of the work; and it is also essential that means be provided which will result in the gradual recession of both cutters and chasers as the work progresses. There are numerous mechanisms known in this art for causing this outward recession of said parts, or for permitting them to recede under the outward thrust of the work, which amounts to substantially the same thing; and any of such mechanisms may be used.

As the invention is embodied in Fig. 1, a cam plate adjuster G is rotatably mounted on the stock, and it is provided with cam ribs $g$ which enter notches $d'$ in the adjacent faces of the chaser block D. A ring K is rotatably mounted upon the work holder, but is located in a groove thereon so that it may not move relatively endwise. It is compelled to rotate in unison with the stock by means of pins $k'$ which are parallel with the axis of the stock, and which are fixed to the ring, and have a sliding engagement in holes in a part of the stock, as the handle sockets thereof. An inclined templet post H is adjustably fixed in an arcual slot $k$ in the ring K, and this templet post goes through a hole in the laterally projecting handle of the cam plate. This precise receding mechanism forms the subject matter of Letters Patent No. 965,320, issued July 26, 1910, and therefore need not be here more specifically described. This construction is shown as a typical example of receding mechanism which may positively move the cutters and chaser blocks in the receding direction. These cam ribs $g$ engage only with the chaser blocks; but each block D is connected rigidly, but adjustably with the associated cutter F, so that they must move in unison.

In the construction as shown, there is a recess $f$ in that face of the cutter which engages an opposed face of the chaser block. A piece N is nicely fitted in this recess and projects into a longer recess $d^2$ in the opposed face of the chaser block. A screw J screws through a hole in the chaser block extending from the outer end thereof to said recess, and the unthreaded end of this screw enters a hole in this piece N with its extreme end abutting the end of the hole. A pin $n$ driven into the piece N enters a circumferential groove $j$ in this unthreaded part of the screw, wherefore the piece N and screw are so connected that said piece N will be moved out or in, relative to the chaser block (and the cutter will go with it) whether said screw is screwed in or out. This construction is only one of many which may be employed for connecting the associated cutters and chaser blocks in a way which permits their relative adjustment and compels their movement in unison when the tool is in use. This construction, however, has certain advantages, namely the piece N and the screw J are really attachments of the chaser block D which is a permanent piece of the tool. The cutter F, however, will be worn away in use, and its cutting end will be gradually ground away when it is sharpened, and will eventually have to be thrown away and a new cutter substituted. In like manner the chaser $d$ removably fitted in the chaser block will be dulled by use, and when sharpened will be worn down and eventually this will have to be thrown away and replaced by another chaser. These wearing parts which have to be replaced are all of the simplest and cheapest possible form, and their replacement therefore is quite inexpensive.

The receding mechanism shown in Figs. 3 and 4 cannot positively withdraw the cutters or chaser carrying blocks; but it does permit them to recede under the outward thrust of the work, and it properly governs their recession. The construction shown is substantially such as is fully described in Letters Patent No. 977,539, issued Dec. 6, 1910, and is herein shown as typical of receding mechanism which permits the recession of the receding parts. In this construction an adjuster E is rotatably mounted on a housing P, which is rotatably mounted on the work holder A, but is prevented from moving endwise upon said work holder. This housing is compelled to rotate with the stock by two pins $p$, $p$, fixed to the housing and slidable endwise in holes on the stock; and the adjuster may be clamped to the housing by screws Q. This adjuster has as many cam surfaces $e$ as there are chaser blocks; and each of these cam surfaces is tapered outward gradually from its front to its rear end. The outer ends of either of said blocks D or cutters F engage with these tapered cam surfaces. In the construction shown it is the chaser blocks which so engage. The cutters are, however, rigidly connected with the blocks by the simple expedient shown, namely, a dowel pin which is nicely fitted in the engaging faces of said cutters and chaser carrying blocks. It is clear that as the stock is screwed into the work holder the cutters and chaser blocks will go with it and their rear ends will slide against the outwardly tapering cam surfaces of the adjuster and will be caused to recede and maintain that engagement by the out thrust of the work upon them. To adjust the cutters and chaser blocks to size the screws Q are loosened and the adjuster is turned relative to the stock B and housing P; and when the adjustment is completed the adjuster is clamped by screws Q to the housing.

From the foregoing it is clear that the invention as defined by the appended claims is capable of embodiment in die stocks having receding mechanism which may compel the cutting tools to recede as the work progresses, or which will merely allow them to recede.

In the appended claims the phrase "to induce the recession" is used as a term comprehending means which may positively withdraw the receding cutting tools as well as means which permit said cutting tools to recede, while the cutting tools are doing the work for which they are provided.

Having described my invention, I claim:

1. In thread cutting tools, the combination of a stock adapted to be rotated and moved longitudinally relative to the work, a set of cutters and a set of chaser carriers all movably mounted on the stock,—the cutters being placed nearer than the chaser carriers to that end of the stock into which the work is inserted, means for adjusting the cutters and chaser carriers for different diameters of work, and means to induce the simultaneous and equal recession of the cutters and chaser carriers while they are doing the work for which they are provided.

2. In thread cutting tools, the combination of a stock adapted to be rotated and moved longitudinally relative to the work, a set of cutters and a set of chaser carriers, all movably mounted on the stock,—the cutters being placed nearer than the chaser carriers to that end of the stock into which the work is inserted, means for adjusting the cutters and chaser carriers relative to each other and for different diameters of work, and means to induce the simultaneous and equal recession of the cutters and chaser carriers while they are doing the work for which they are provided.

3. In a thread cutting tool, the combination of a stock having approximately radial guideways, a cutter and a chaser block mounted in each guideway, means separably connecting each chaser block and its associated cutter, and means whereby the said chaser carriers and cutters are induced to slowly recede as they do the work for which they are provided.

4. In a thread cutting tool, the combination of a stock adapted to be rotated and moved longitudinally relative to the work, said stock containing approximately radial guideways, a cutter and a chaser carrier provided with a removable and replaceable chaser, mounted in each guideway, means for separably connecting each cutter and its associated chaser carrier, and means whereby said chaser carriers and cutters will be induced to recede as they do the work for which they are provided.

5. In a thread cutting tool, the combination of a stock having approximately radial guideways, a cutter and a chaser carrier mounted in each guideway, means separably connecting each chaser carrier and its associated cutter, means whereby the said chaser carriers and cutters slowly recede as they do the work for which they are provided, and means for adjusting each chaser carrier and its associated cutter relative to each other.

6. In a thread cutting tool, the combination of a work holder adapted to be clamped upon the work to be threaded, a stock having a lead screw connection with the work holder and having also a plurality of approximately radial guideways, a cutter mounted in each guideway, a chaser carrier also mounted in each guideway and fixedly connected with the associated cutter, a chaser removably mounted on each chaser carrier, means for simultaneously adjusting all of the chaser carriers and cutters, and means whereby all of the chaser carriers and cutters are induced to gradually recede as they are doing the work for which they are provided.

7. In a thread cutting tool, the combination of a stock adapted to rotate and move longitudinally relative to the work and having a plurality of approximately radial guideways, cutters movably mounted in said guideways, chaser carriers also movably mounted in said guideways, means fixedly connecting each cutter with its associated chaser carrier, a chaser removably mounted upon said chaser carrier, and a cam plate adjuster mounted on the stock for simultaneously adjusting all of the chaser carriers and cutters.

8. In a thread cutting tool, the combination of a stock adapted to rotate and to move longitudinally with relation to the work to be threaded, said stock having a plurality of approximately radial guideways, chaser carriers movably mounted in said guideways, a cutter separably connected with each of said chaser carriers, and a chaser also separably connected with each of said chaser carriers, and means for simultaneously adjusting all of said chaser carriers and the said parts connected thereto.

9. In a thread cutting tool, the combination of a stock adapted to rotate and to move longitudinally with relation to the work to be threaded, said stock having a plurality of approximately radial guideways, chaser carriers movably mounted in said guideways, a cutter separably connected with each of said chaser carriers, and a chaser also separably connected with each of said chaser carriers, means for simultaneously adjusting all of said chaser carriers and the parts connected thereto, and means for inducing the simultaneous recession of all of said chaser carriers and connected parts as the stock is advanced along the work during the threading operation.

10. In a thread cutting tool, the combination of a stock adapted to rotate and to move longitudinally with relation to the work to be threaded, said stock having a plurality of substantially radial guideways, a chaser carrier mounted in each guideway having in its side a groove, a chaser removably mounted in each of said grooves, and an adjuster movably mounted relative to said stock and engaging all of said chaser carriers for adjusting them to size and for inducing the simultaneous recession of said chaser carriers.

In testimony whereof, I hereunto affix my signature in the presence of two witnesses.

RUSSELL B. TEWKSBURY.

Witnesses.
  H. R. SULLIVAN,
  A. J. HUDSON.

---

Copies of this patent may be obtained for five cents each, by addressing the "Commissioner of Patents, Washington, D. C."